(No Model.)  6 Sheets—Sheet 1.
J. Q. HART.
PLATFORM ADJUSTMENT FOR HARVESTING MACHINES.
No. 391,845.  Patented Oct. 30, 1888.
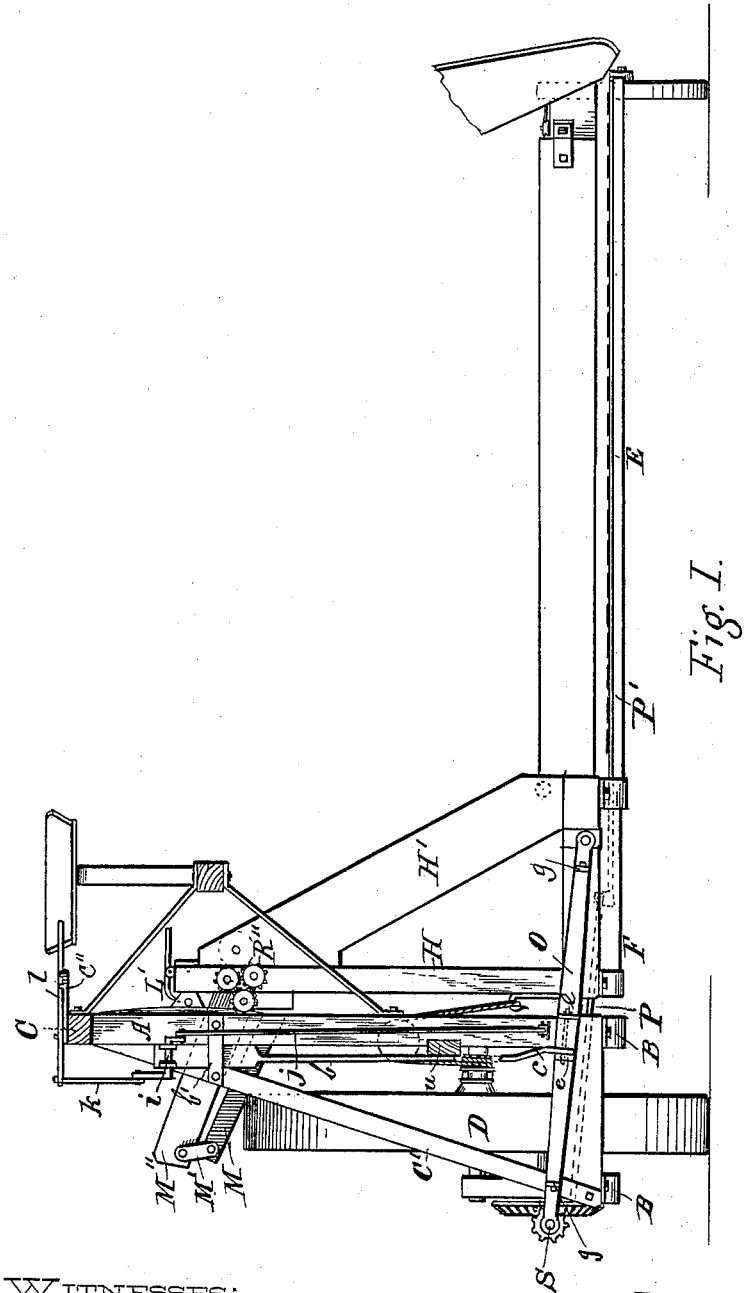
Fig. I.
WITNESSES:
Robt. S. Millar.
Robert Kirk
INVENTOR:
John Q. Hart
By J. S. Zerbe
Attorney.

(No Model.) 6 Sheets—Sheet 2.
J. Q. HART.
PLATFORM ADJUSTMENT FOR HARVESTING MACHINES.
No. 391,845. Patented Oct. 30, 1888.
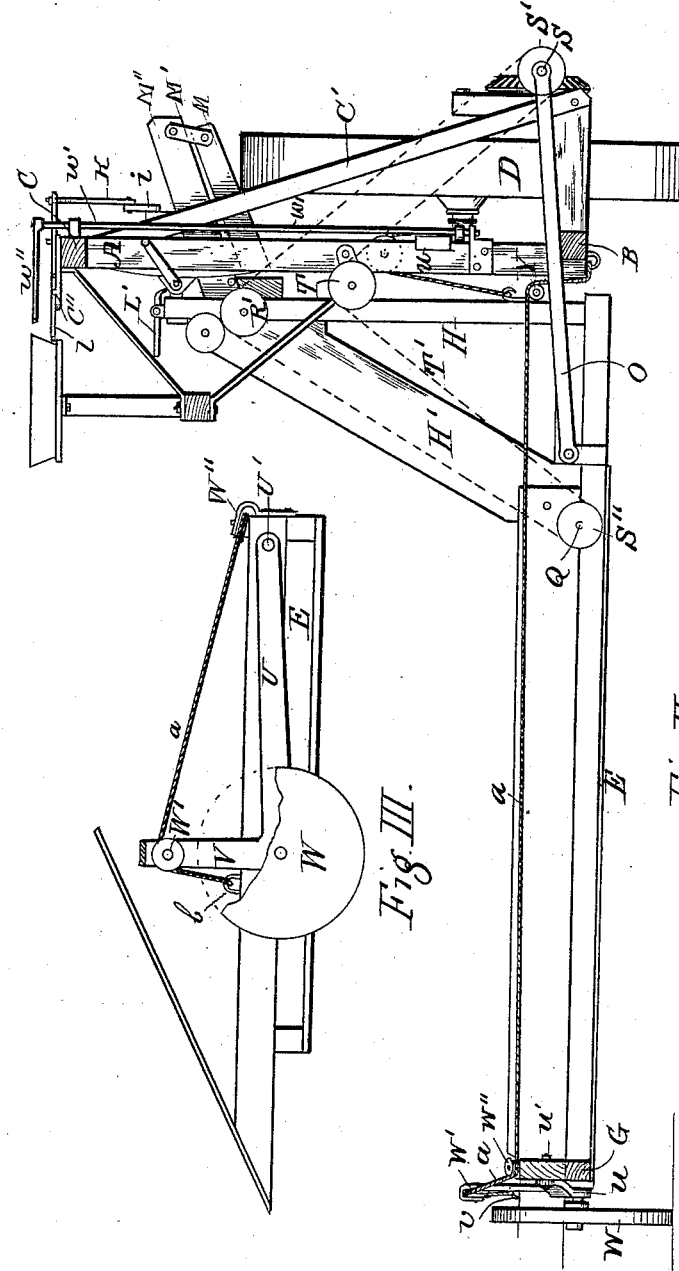
WITNESSES:
R. S. Millar
Robert Kirk
INVENTOR:
John Q. Hart
By J. S. Zurb
Attorney.

(No Model.)  6 Sheets—Sheet 3.
J. Q. HART.
PLATFORM ADJUSTMENT FOR HARVESTING MACHINES.
No. 391,845.  Patented Oct. 30, 1888.
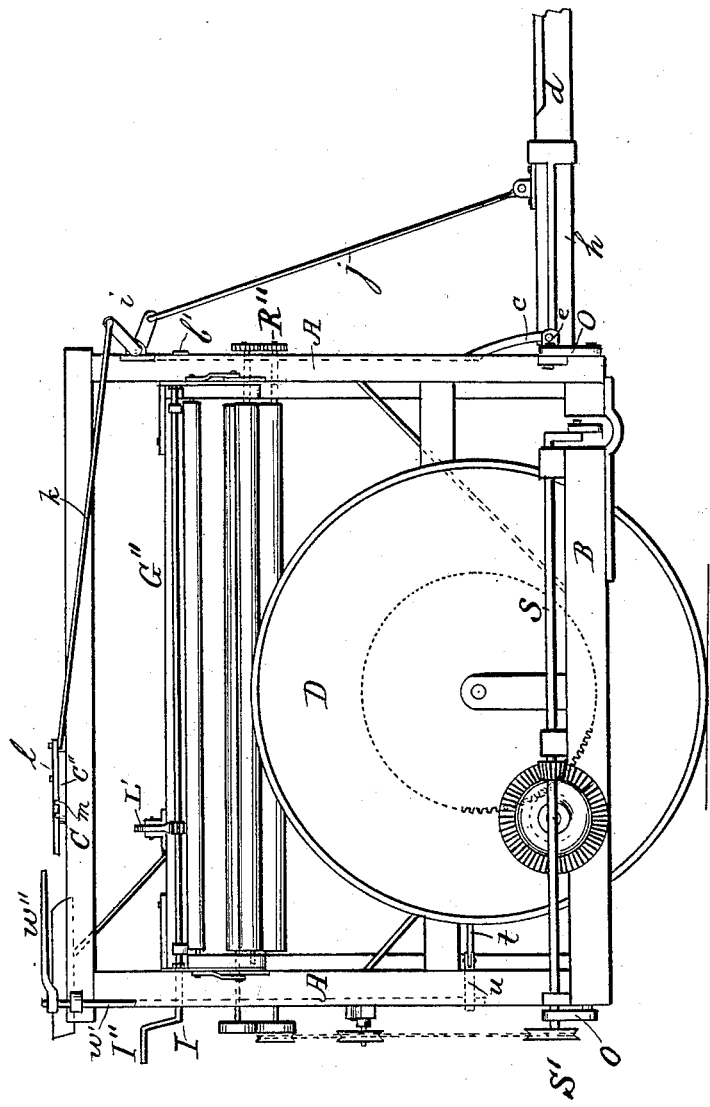
Fig. IV.
WITNESSES:
R. S. Millar.
Robert Kirk.
INVENTOR:
John Q. Hart
By J. S. Probe
Attorney.

(No Model.)
J. Q. HART.
PLATFORM ADJUSTMENT FOR HARVESTING MACHINES.
No. 391,845. Patented Oct. 30, 1888.
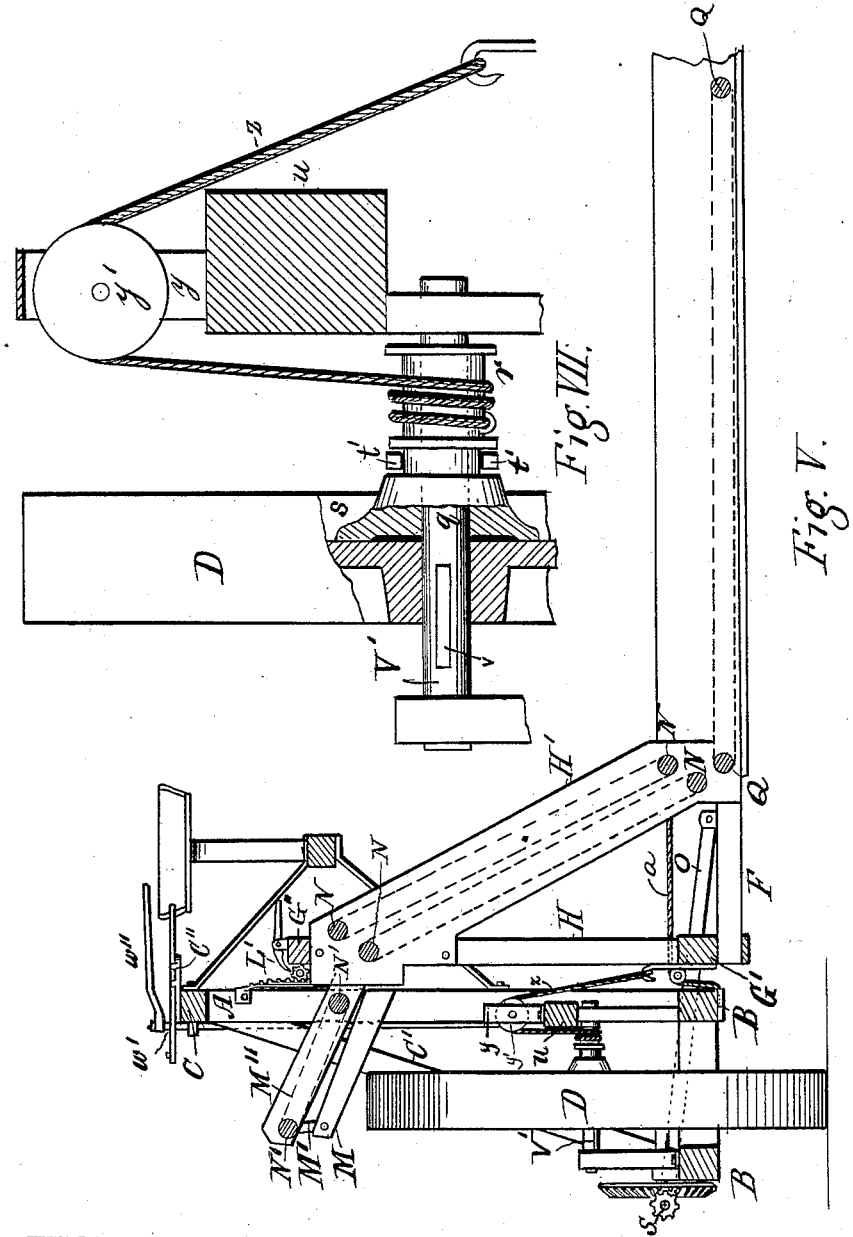
Witnesses:
Robt. S. Millar
Robert Kirk
Inventor:
John Q. Hart
By J. S. Zerbe
Attorney.

(No Model.) 6 Sheets—Sheet 5.
J. Q. HART.
PLATFORM ADJUSTMENT FOR HARVESTING MACHINES.
No. 391,845. Patented Oct. 30, 1888.
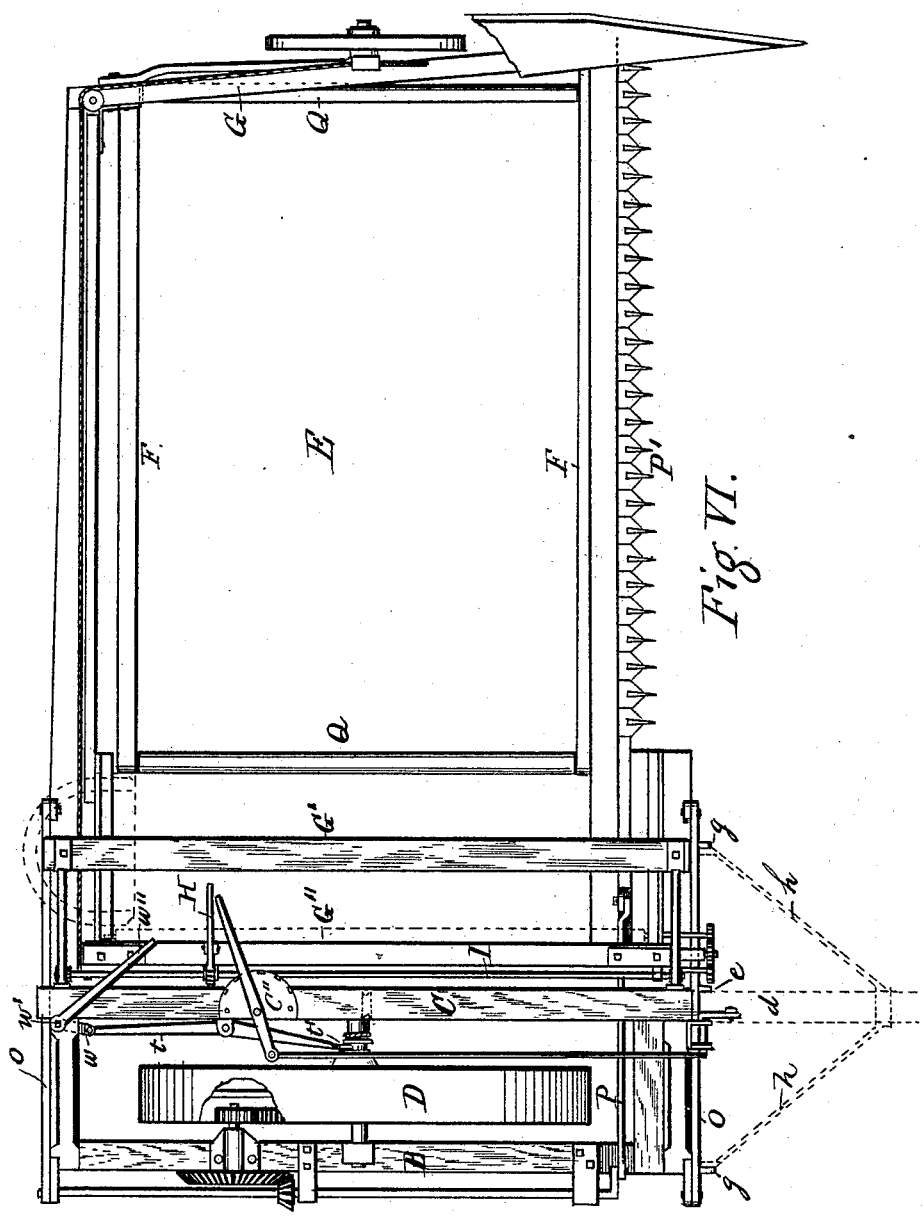
WITNESSES:
R. S. Millar.
Robert Kirk.
INVENTOR:
John Q. Hart
By 
Attorney.

(No Model.) 6 Sheets—Sheet 6.
J. Q. HART.
PLATFORM ADJUSTMENT FOR HARVESTING MACHINES.
No. 391,845. Patented Oct. 30, 1888.
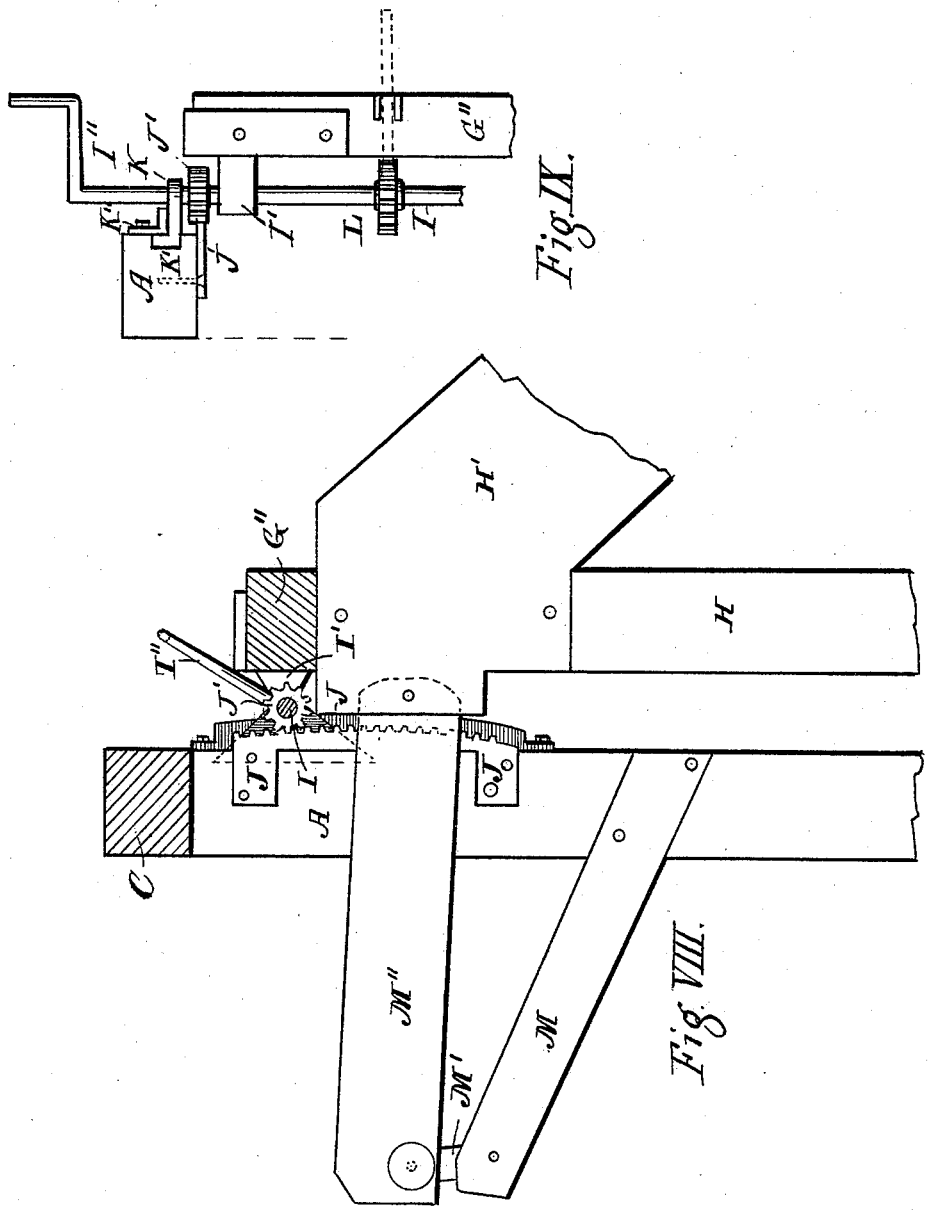
WITNESSES:
Robt. S. Millar.
Robert Kirk.
INVENTOR:
John Q. Hart.
By J. S. Birk
Attorney.

UNITED STATES PATENT OFFICE.

JOHN Q. HART, OF SULPHUR SPRINGS, INDIANA.

PLATFORM ADJUSTMENT FOR HARVESTING-MACHINES.

SPECIFICATION forming part of Letters Patent No. 391,845, dated October 30, 1888.

Application filed August 19, 1887. Serial No. 247,328. (No model.)

*To all whom it may concern:*

Be it known that I, JOHN Q. HART, of Sulphur Springs, in the county of Henry and State of Indiana, have invented a new and useful Improvement in Platform Adjustments for Harvesting-Machines, which improvement is fully set forth in the following specification and accompanying drawings, in which—

Figure 1 is a front view of my improved harvesting-machine. Fig. 2 is a rear view of the same. Fig. 3 is a side view of the outer end of the platform; Fig. 4, a view of the opposite end or side of the main frame and driving-wheel; Fig. 5, a cross vertical sectional view taken at a point just in rear of the drive-wheel, as shown in Fig. 4; Fig. 6, a top or plan view; Fig. 7, an enlarged detail view of the drive-wheel shaft and its connections; Fig. 8, an enlarged vertical section of the rack-bar and pinion for raising and lowering the grain-platform by the hand, and Fig. 9 is a plan view of the same parts for raising or lowering the platform by hand.

The object of my invention, briefly stated, is to construct a vertically-adjustable platform, sickle-bar, and elevator-frame for harvesting-machines.

The main frame, which here comprises, for convenience, the posts A, sills B, and top cross-pieces, C, and braces C', for holding the several parts of the machine, as well as the drive-wheel D, may all be constructed in the usual manner, or especially adapted to a vertically-movable platform, as herein shown. It is also obvious that the geared mechanism for operating the sickle-bar is not specially affected by the improvement here set forth.

Referring now particularly to Figs. 1, 2, 3, and 6, E represents the vertically-movable platform or table, upon which the straw falls after being cut by the sickle-bar, supported by the parallel lateral bars F and the cross-pieces G G', Fig. 6. The inner end of this platform-frame has at each side a standard or post, H, Figs. 1, 2, and 5, held rigidly in position by means of braces H', and these posts are held together by means of a connecting bar or beam, G'', at their upper ends. At the upper ends of these posts H H, and alongside of the beam G', is a shaft, I, Figs. 4 and 9, journaled thereto at I'. The rear projecting end of the shaft has a crank, I''. By the side of each boxing I', and on a line with the inner faces of the posts, are toothed bars J, secured to the standards A, the teeth of which engage with pinions J' on the shaft I. On the outer sides of these pinions J' the shaft I passes through sliding boxing K, the inner ends of which have right-angled flanges K', which are adapted to slide in suitable grooves in the post A, behind keepers or plates K''. Near the rear end of the frame and in proximity to the driver's seat is a pinion, L, and on top of the post H is a pawl, L', which operates in contact with the pinion L, so as to prevent the latter from turning. This pawl is to be operated by the foot of the driver.

M is a rigid arm projecting out from the post A, and M'' is an arm hinged at its inner end to the post H, or to the extension of the braces H'. The outer ends of these arms are provided with vertically-disposed links M', to the upper ends of which are hinged the outer ends of arms M''. The object of this is to provide a compensating movement for the aprons which travel over the rollers N, attached to the braces H' and to the rollers N' on the arms M'' in the upward and downward movement of the posts H and braces H'. The lower ends of the posts H are attached to the reaper-frame by means of the connecting rods or bars O, as shown in Figs. 1 and 2. One end of each rod O is hinged or pivoted to the outer end of the sill B of the frame and the other end to a point removed from the inner or abutting ends of the frame and platform. It will thus be seen that the platform E and the posts H and the wide braces H' are held rigidly together, the platform being somewhat narrower than the distance between the posts H, so as to afford space between the forward ends of the platform and the front posts, A H, and brace H', in which the pitman-rod P and sickle P' operate, the latter of which requires, however, no description in this invention.

Q Q represent the rollers at opposite ends of the platform E, around which the endless canvas carrier or apron travels. The wide braces H' have at their upper and lower ends a set of rollers, N, extending between them. The lower rollers are so located with reference to the inner roller Q in the platform that as the straw is conveyed to the rollers N it will be grasped between the rollers and conveyed by the aprons thereon to the apron on the rollers N'.

In Fig. 2 is shown the system of belting and pulleys that is employed to operate the carriers and aprons, in which the lower one of the upper rollers N, carrying the pulley R', extends across to the opposite post and imparts motion to the rollers through the medium of the cog-gears R''. (See Fig. 1.) The shaft S, which imparts motion to the sickle-bar, has at its rear end a pulley, S', and the rear projecting end of the inner roller-shaft Q has also a pulley, S''. The post A is also provided at its rear side, a short distance below the pulley R' on the post H, with an idler-pulley, T. A belt, T', extends over these pulleys R' S' S'' T, and thus imparts motion from the shaft S to the aprons or carrier-belts on the platform E, as well as to those operating on the rollers N N on the wide braces H', and to the apron on the rollers N' of the arms M''. The outer end of the platform, as shown in Fig. 3, has a bar, U, which is hinged to the side of the frame, near the rear end, at U'. This bar extends forwardly to a point midway between the ends, where it is turned upwardly at right angles to form a standard or arm, V. The grain-wheel W is attached to the angle of the bars U V. The upper end of the bar or arm V carries on its inner side a grooved pulley, W', and on the corner of the platform-frame, near the bar-pivot U', is another grooved pulley, W''. The inner end of the platform-frame, preferably on H, as shown in Fig. 2, which abuts the post A, has also a grooved pulley, Y, for purposes which will be hereinafter explained.

As it is important to at all times keep the platform parallel with the surface of the ground, I will now show the manner in which this is accomplished by means of the device shown in Fig. 3.

A rope, $a$, having one of its ends attached to the outer end of the platform at a point, $b$, near the location of the arm V, passes over the pulley W', around the pulleys W'' Y, and thence down to the lower end of the post A, to which the end of the rope is attached. It will thus be observed that as the inner end of the platform is lowered the pulley Y, being also depressed, slackens the rope $a$, and as the outer end of the platform is suspended on the rope $a$ any slackening of the rope permits the platform to descend, thus exactly compensating for any upward or downward movement of the inner end through the medium of the windlass or levers on the main frame.

The crank I'' is designed to raise the platform, and the weight of the latter is sufficient to depress it when the pawl L' is released, and in this connection I have devised an adjustable tongue-and-brace attachment, whereby the platform, as well as the main frame, will be supported and kept in position as the harvester is drawn forward by the team. This consists, as shown in Figs. 1, 4, and 6, of an arm or standard, $b$, on the side of the front post A, the upper end of which passes through a guide-piece or keeper, $b'$, attached to the post A, and the lower end, $c$, of which is hinged to the tongue or pole $d$. The rear end of the tongue $d$ is hinged to a clip, $e$, which clip is secured centrally on the connecting bar or rod O, which corresponds with the bar O on the rear end of the frame. On the front face of the bar O, at each end, is an eye, $g$, and to these eyes is hinged the V-tongue brace $h$. The tongue, passing through the angle of this brace and secured at its rear end to the connecting-bar centrally, causes an equal pull on both the main frame and on the platform portion of the harvester, whatever may be the elevation of the platform. In order now to raise or depress the sickle-bar without raising or lowering the entire platform, I place a bell-crank lever, $i$, on the standard $b$, near its upper end, and to one of the limbs of this lever I attach one end of a connecting-rod, $j$, the other end of which is secured to the tongue $d$, some distance forward of its pivotal point in the clip $e$. The other limb of the bell-crank lever has one end of a connecting-rod, $k$, attached, the other end of which is secured to the short end of a lever, $l$, on the top plate, C''. This lever operates in contact with a toothed-rack segment, $m$, secured also to the plate C'', so that the tongue may be held rigidly at any suitable angle when the harvester is in operation.

As it is sometimes of vital importance to be able to suddenly raise the platform, which would be difficult to do by hand, I have devised a power attachment, whereby the forward motion of the harvester may be utilized for this purpose. I describe this by reference to Figs. 5, 6, and 7. The shaft V' of the drive-wheel D, to which shaft the wheel is secured by the key $v$, is provided on its inner end by the side of the wheel with a sleeve, $r$, having suitable collars, between which collars a rope may be wound. The end of this sleeve which abuts the wheel is a hollow cone, which affords frictional contact with the corresponding cone-shaped hub of the wheel D. $t$ represents a horizontal lever hinged centrally behind the shaft V' to a bar, $u$, which extends between the posts A. The forward end of this lever is bifurcated, as shown at $t'$. The sleeve $r$ is provided with a groove to receive the bifurcated end of the lever. The rear end of this lever is connected with a right-angled arm, $w$, on a vertical shaft, $w'$, which is journaled on the side of the rear post A. The upper end on the shaft $w'$ has a lever, $w''$, which extends within reach of the driver. The horizontal beam $u$, at a point directly above the drive-shaft $q$, is provided with a pulley-block, $y$, carrying a grooved pulley, $y'$. A rope, $z$, wound around the sleeve $r$, extends over the pulley $y'$, and thence down to the platform E. The operation of this is as follows: Should the driver desire to elevate the platform, he grasps the lever $w''$ and draws it toward him. This causes the hollow cone S of the sleeve $r$ to bind against the hub of the drive-wheel, and causes the rope $z$ to wind on the sleeve $r$, and consequently raise the platform.

As the manipulation of the sickle-bar is not a special feature of this invention, I omit it, as I desire to particularly call attention to the raising and lowering devices; the canvas frame made separate from the main frame or conveyer; a lever on the main frame within easy reach of the driver, whereby he can either raise or lower the platform or depress the forward side of the platform carrying the sickle-bar; the power mechanism for raising the platform, and the adjustable tongue and braces, whereby the pull of the team is equally distributed between the main frame and the platform-frame. These, with other auxiliary points, constitute the principal features, for which I claim the following:

1. In a harvesting-machine, the main frame mounted on a single drive-wheel, having on one side hinged thereto by means of connecting links or bars a vertically-movable platform, the abutting end of which has a shaft and pinions, with a suitable crank and rack-bars on the abutting end of the posts of the main frame, and a bar on the outer end of the platform, one end of which is hinged to the platform-frame, and to the other end of which is secured the grain-wheel, said bar having a vertical extension which carries a grooved pulley, and the rope $a$, attached at one end to the platform, passed over the grooved pulley, and secured at the other end to the main frame, the said several parts constructed and combined together as described, whereby the outer end of the platform is raised or permitted to fall as the inner end of the platform is raised or lowered, substantially as herein set forth.

2. In a harvesting-machine, the main frame composed of the sills B, vertical posts A, and top cross-pieces, C, mounted on a single wheel, in combination with the platform E, having at its inner end vertical posts H and elevator side pieces, H', to brace the post H against the platform, upon the upper ends of which are mounted bearings for a cross-shaft provided with pinions and a crank, the inner end of said platform being hinged to the main frame by means of connecting-links O O, the vertical posts A of the main frame having rack-bars to engage said pinions, the power windlass or sleeve $r$, mounted on the axle of the drive-wheel, the rope $z$, wound around said sleeve, passed over a pulley on the main frame, and connected to the platform for raising said platform, the grain-wheel W, attached to the bar U, hinged to the outer end of the platform, the vertical arm V of said bar carrying the grooved pulley, and the rope $a$, attached at one end to the main frame, passed over the pulley on the arm V, and connected at its other end to the platform-frame, the several parts combined, connected, and adapted to operate as described.

3. The combination, in a harvesting-machine composed of the main and platform frames connected together by hinged bars O, the forward side of the main frame and platform-frame provided with a brace for the tongue, having its bifurcated ends hinged to the opposite ends of the front pivoted bar O, of a vertical arm or bar attached at its lower end to the said bar, its upper end sliding in a guide, $b'$, and having a bell-crank lever, $i$, at its top, the connecting-rod $j$ between one limb of the bell-crank lever and tongue $d$, and the connecting-rod K between the other limb of the bell-crank lever and the hand-lever $l$, substantially as herein set forth.

4. In a harvester, the combination of the vertically-adjustable platform, the single drive-wheel D, its hub, the shaft V', in which the wheel is mounted, the sleeve $r$, also on said shaft, and its inner end adapted to abut in frictional contact with the hub, the rope $z$, secured at one end to the platform and at the other end to the sleeve, the horizontal lever $t$, hinged to the bar $u$ and used to slide the sleeve into or out of contact with the hub, and the lever within reach of the driver to operate the horizontal lever, substantially as described.

In testimony that I claim the foregoing I have hereunto set my hand, this 4th day of March, 1887, in the presence of two witnesses.

JOHN Q. HART.

Witnesses:
JAMES SHARKEY,
W. D. McCORMACK.